United States Patent [19]

Suzuki

[11] Patent Number: 4,762,562
[45] Date of Patent: Aug. 9, 1988

[54] METHOD OF PREPARING AND MOLDING MORTAR OR LIKE

[76] Inventor: Toshiro Suzuki, Chiyozaki-jutaku 1-305, Chiyozaki-cho 2-71, Naka-ku, Yokohama-shi Kanagawa, Japan, 231

[21] Appl. No.: 120,753

[22] Filed: Nov. 9, 1987

Related U.S. Application Data

[63] Continuation of Ser. No. 852,941, filed as PCT JP85/00423 on Jul. 26, 1985, published as WO86/00884 on Feb. 13, 1986, abandoned.

[30] Foreign Application Priority Data

Jul. 31, 1984 [JP] Japan .................................. 59-160677
Jul. 3, 1985 [JP] Japan .................................. 60-146273

[51] Int. Cl.$^4$ ............................................. C04B 14/02
[52] U.S. Cl. ........................................ 106/97; 106/85; 106/86
[58] Field of Search ............................. 106/85, 86, 97

[56] References Cited

U.S. PATENT DOCUMENTS 3,813,460  5/1974  Tardieu ................................. 264/28

FOREIGN PATENT DOCUMENTS 2205494  5/1974  France .
238615  8/1925  United Kingdom ................... 106/86

OTHER PUBLICATIONS

American Concrete Institute Journal, Dec. 1972, "Control of Cracking in Concrete Structures".

Primary Examiner—Steven Capella
Attorney, Agent, or Firm—James H. Tilberry

[57] ABSTRACT

A method of preparing and molding a hydraulic cement-containing composition such as concrete or mortar is disclosed, which can be extensively utilized in the fields of civil engineering, construction projects, or the like. In the preparation of a hydraulic cement-containing composition, cement and water, and sand, gravel or the like, if necessary, are kneaded together to cause the hydration reaction. A feature of the present invention resides in preparing a mortar or the like containing water necessary for the hydration reaction in the form of ice pieces and causing the hydration of cement and water to result from the melting of the ice pieces.

10 Claims, 5 Drawing Sheets

METHOD OF PREPARING AND MOLDING MORTAR OR LIKE

This is a continuation of application Ser. No. 852,941, filed as PCT JP85/00423 on Jul. 26, 1985, published as WO86/00884 on Feb. 13, 1986, now abandoned.

DESCRIPTION

1. Technical Field

This invention relates to a method of preparing and molding a hydraulic cement-containing composition (hereinafter referred to as mortar) such as cement paste, mortar and concrete where water necessary for hydration of cement is obtained from ice pieces.

2. Background Art

To prepare a hydraulic cement-containing composition, cement and water, and also such aggregate as sand or gravel, if necessary, are mixed and kneaded together. According to the water-cement ratio theory, the mechanical strength of the hydraulic cement-containing composition after the solidification is higher when the quantity of water is lower with respect to cement. Recently it has been noted that when such a composition is solidified in the neighborhood of the minimum water necessary for the hydration of the cement, a very high mechanical strength can be obtained, and not only a high compression strength but also a high tensile strength, bending strength and shearing strength.

Meanwhile, the preparation of mortar or the like requires workability, More specifically, it is necessary to ensure adequate softness, fluidity, viscosity and plasticity, these factors being related to the difficult or ease of handling mortar or the like before solidification, i.e., during preparation, charging, molding, etc. Usually, a considerably greater amount of water than the amount necessary for the hydration of the cement is used to ensure workability. Also, various admixtures are used to reduce the amount of water. However, the minimum quantity of water necessary for the hydration is very small so that it is difficult to ensure workability with this small amount of water. Further, the mechanical strength after solidification depends not only on the water-cement ratio, but also on the homogeneity of the mixture of cement and aggregate, and agitation and kneading during the hydration reaction, which are not only important factors, but difficult to carry out.

In a further aspect, since the hydration reaction proceeds as mortar or the like is agitated and kneaded with water, there are time restrictions on the transportation of raw mortar or the like. Sometimes, a retarder is used. However, generally it is difficult to control the hydration reaction time.

In a still further aspect, in the preparation of mortar or the like there are problems to be solved in connection with early release from a mold, i.e., early build-up of mechanical strength, facilitation of press molding and freedom from shrinkage. Various attempts have been made to solve these problems by using various admixtures. These attempts, however, have merits and demerits of their own.

The present invention seeks to provide a solution to these problems wherein water is incorporated into a mortar or the like in the form of ice pieces.

DISCLOSURE OF INVENTION

A feature of the present invention resides in a method of preparing mortar or the like by mixing and kneading together cement which includes the mixture of cement and various admixtures) and water necessary for the hydration of cement in the form of ice pieces to prepare a paste, and then melting the ice pieces in the paste to cause the hydration reaction of the resultant water with the cement. Further, according to the present invention, a mortar paste containing ice pieces is pressurized to a high density state, and the hydration reaction of water resulting from the melting of the ice pieces and cement is caused to thereby form mortar or the like having high mechanical strength.

In this preparation method, water is added in the form of ice pieces, and the hydration reaction is delayed by holding the mixture material at a low temperature while maintaining the homogeniety needed to uniformly disperse a small quantity of water over the entire cement mixture, which allows improved workability of mixing and kneading. A uniform dispersion is obtained prior to substantial melting of the ice pieces. Thereafter, all remaining ice pieces are melted substantially completely prior to placement of the mortar. The melting of ice pieces is either done naturally, by heat, or by pressure application.

With this molding method, a homogeneous and defect-free dense molding is formed from mortar of a low water-cement ratio where water is incorporated in the form of ice pieces, and a high mechanical strength owing to a low water-cement ratio is realized in the molding.

The period of melting of the ice greatly depends on the temperature and diameter of the ice pieces. Thus, the time until the hydration reaction of the raw mortar or the like occurs can be controlled by suitably selecting the temperature and size of the ice pieces. Further, the ice pieces may be sieved, if necessary, to select a predetermined ice piece diameter.

In the preparation method according to the present invention, a low water-cement ratio is set by reducing the amount of ice pieces in the range in which a homogeneous paste, and a defect-free dense solidified product can be obtained, according to the raw mortar pasting conditions and the conditions of compression and solidification at the time of the molding. The ice pieces may be obtained by pulverizing an ice mass at a predetermined temperature, or ice pieces may be deep frozen to a predetermined temperature.

The speed of melting of the ice pieces may be controlled by providing a kneading trough or mixer car for kneading mortar or the like, or a mortar storage trough with cooling means or heat insulation material.

To prepare mortar or the like by mixing and kneading together cement, aggregate and ice pieces, the cement, aggregate and ice pieces may be simultaneously and homogeneously mixed together. Further, cement and fine aggregate may first be mixed and kneaded together, and then the mixture may be further kneaded with added ice pieces. Further, if necessary, coarse aggregate may be added and kneaded with the mixture.

Further, with this method of preparing mortar or the like it is possible to obtain polymer mortar or the like by incorporating rubber latex polymer or the like, or by adding a monomer and causing polymerization thereof in the paste. For example, where a water-soluble monomer, e.g., methacrylic acid, acrylonitrile or the like and a redox polymer initiator is frozen together with water to produce ice pieces, these ice pieces are used to prepare a mortar paste, and polymerization of the monomer occurs in the mortar paste, thereby obtaining a polymer mortar. Further, it is possible to obtain fiber-reinforced mortar or the like by incorporating asbestos, carbon fiber, metal fiber or the like and also to use metal powder, e.g., iron powder, as the aggregate.

As has been shown, according to the present invention, cement, aggregate and ice pieces are kneaded together, so that these components form into a homogeneous paste. Since water for the hydration reaction results from the melting of ice pieces, it may be very small in quantity because the ice pieces are uniformly mixed.

Further, the compression strength and bending strength can be significantly improved as will be shown in the results of the experiments to be described below. A particularly high mechanical strength can be obtained by preparing and compression molding mortar by the molding method according to the present invention.

According to the preparation method of the present invention early strength and crack prevention can be significantly improved, and it permits early separation from the mold. Further, the presence of ice pieces in the mortar or the like maintains the mortar paste at a low temperature, thus delaying the hydration reaction and time until charging. Further, the time of delay of the hydration reaction can be suitably set by appropriately controlling the temperature of the mixture. Thus, it is possible to alleviate restrictions on the retention time of mortar or the like prepared in a concrete mixer plant or the like and extend the area in which the prepared mortar or the like is supplied.

Particularly, according to the present invention, workability can be ensured with any amount of water, and mortar or the like with a very low water-cement ratio can be ensured. Further, since no water drains out, the compression molding is facilitated, and it is possible to manufacture products having high density and high mechanical strength. Further, the hydration reaction can be controlled by suitably selecting the order of mixing of the components according to temperature and other conditions.

Further, the preparation can be facilitated by freezing an aqueous solution of a macro-molecular material and a hardened material thereof in advance.

Further, various fibers and metal powders can be very readily and homogeneously incorporated with the ensured workability of low resistance of the mortar paste when kneaded.

DESCRIPTION OF EXAMPLES

Now the present invention will be described in detail in connection with the following examples:

EXAMPLE 1

Temperature changes of cement pastes prepared by incorporating two different kinds of ice pieces into Portland cement at respective temperatures $-2°$ C. and $-26°$ C. with the lapse of time were obtained.

Water-cement ratio: 30%
Kneading period: 3 minutes

Figure 1:
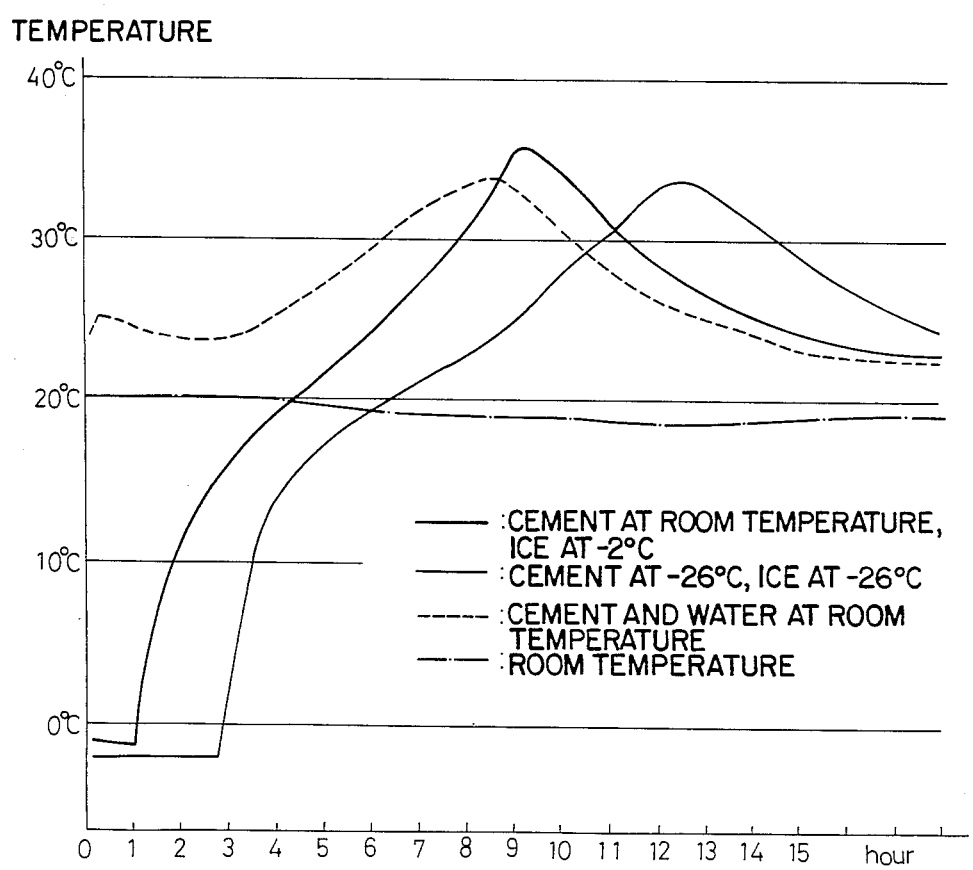
FIG. 1 is a graph showing the temperature of cement paste in Example 1 plotted against time.

Each cement paste thus obtained was charged into a cylinder of a laminated board (with a thickness of 9 mm) with a square bottom of 7 cm by 7 cm as to a height (H) of 12 cm, and a central position at a height (h) of 5 cm from the bottom is made the point of temperature measurement. As a contrast, a cement paste is prepared using water at room temperature, and its temperature changes with the lapse of time were obtained. The results are shown in FIG. 1.

The time until the temperature peak accompanying the hydration of the cement paste varies with the temperture of the ice pieces. With ice at $-26°$ C. the curing can be greatly delayed compared to the case of ice at $-2°$ C.

EXAMPLE 2

Figure 2:
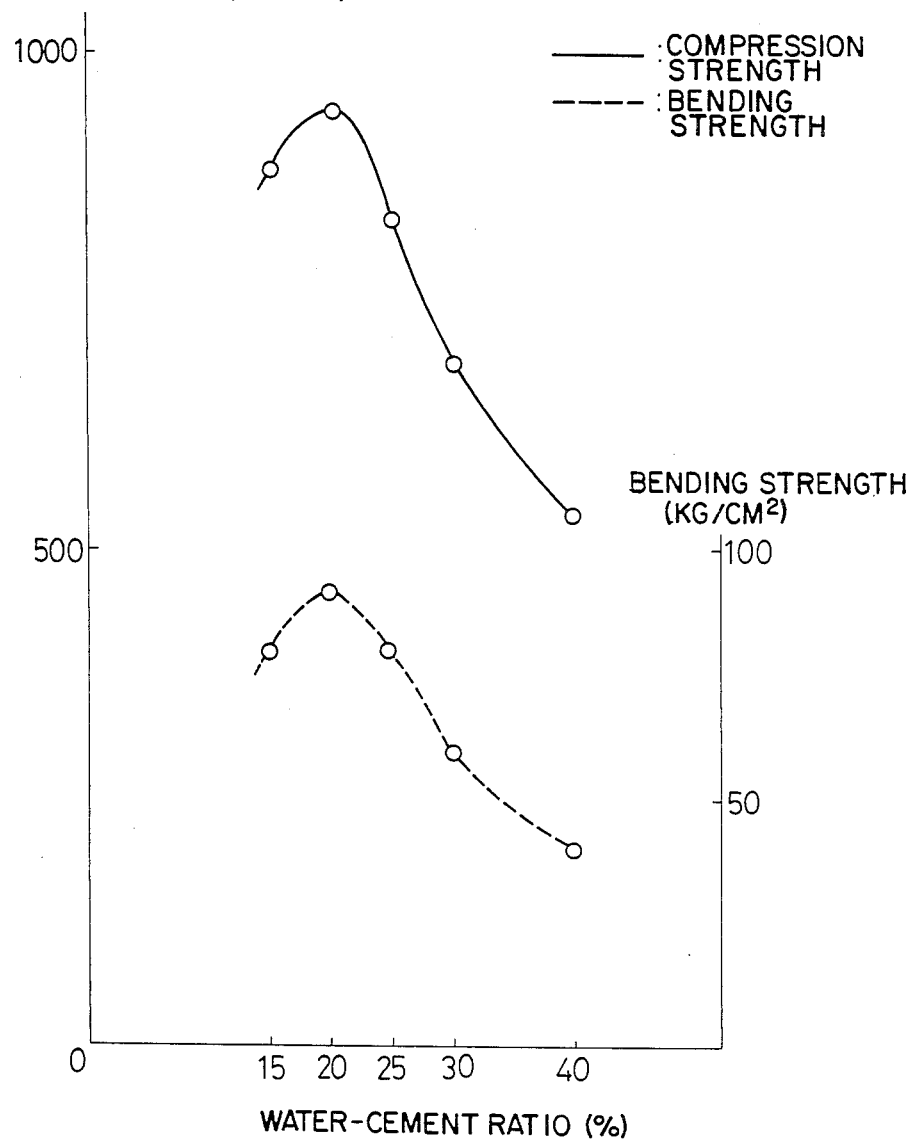
FIG. 2 is a graph showing a relation between compression strength and water-cement ratio in Example 2.

Cement pastes incorporating ice pieces in different water-cement ratios were prepared and cured in the sealed state, to prepare solidified products (allowed to age for 28 days). The relationship of the water-cement ratio to the compression strength and bending strength was observed. The results are shown in the graph of FIG. 2.

Very high compression strength and bending strength were obtained with samples where the water-cement ratio was 25% or below. At the same time, it was made obvious that dense products could be formed by this method even if the water-cement ratio was less than 25%.

EXAMPLE 3

Figure 3:
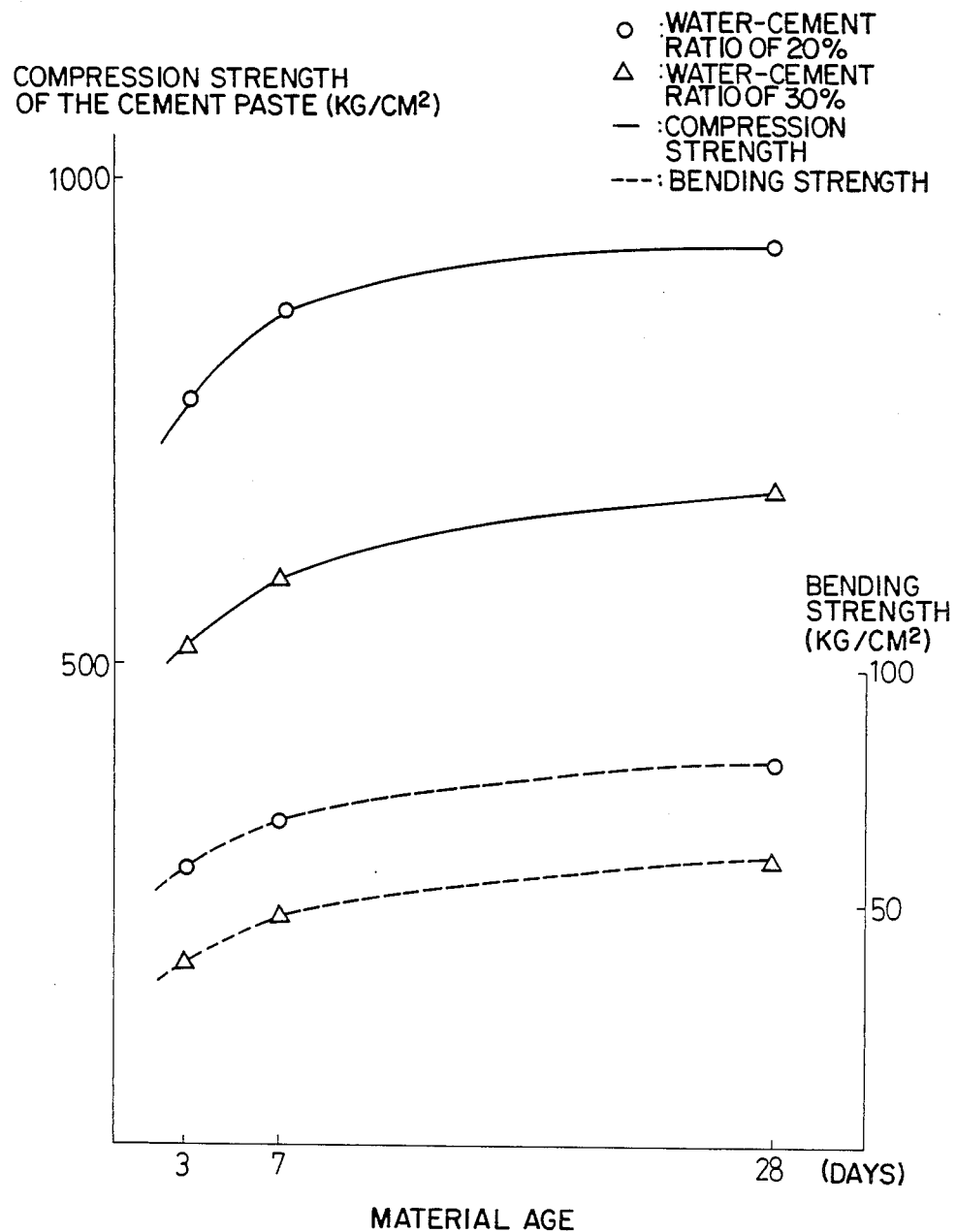
FIG. 3 is a graph showing a relation between compression strength and age in Example 3.

Cement pastes with water-cement ratios of 20% and 30% were prepared by incorporating ice pieces into Portland cement and were cured in the sealed state to produce solidifed products. The relationship of the compression strength and bending strength to the age was observed. The results are shown in FIG. 3. It was found that the mechanical strength builds up early, and separation from the mold is possible after a short period of curing.

EXAMPLE 4

Mortar samples were prepared by mixing cement, sand and ice pieces, and the relationship of the compression strength and bending strength to the water-cement ratio was observed.

Figure 4:
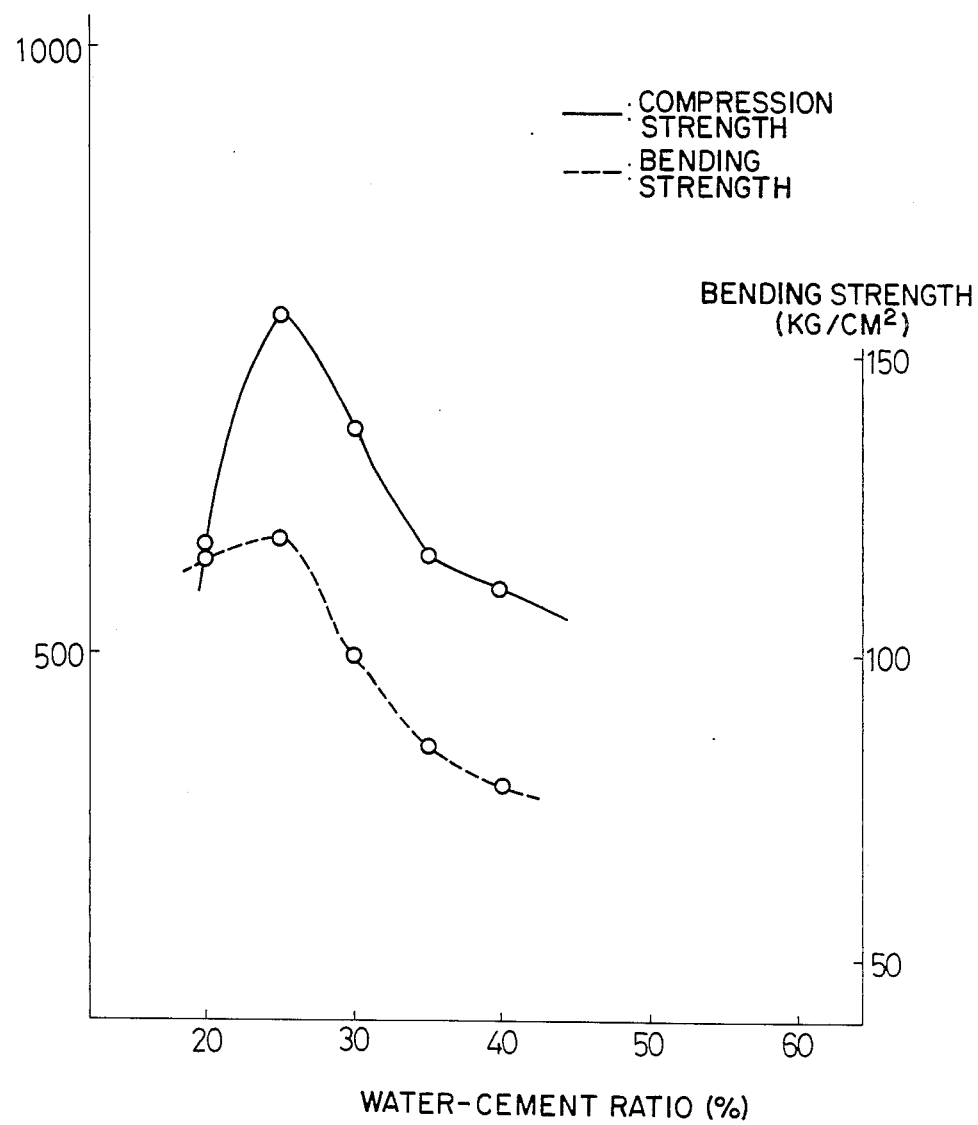
FIG. 4 is a graph showing a relation between compression strength and water-cement ratio in Example 4.

The materials used are as follows:
Cement: Normal Portland cement
Sand: Sand of the river "Fujigawa" (with a grain size of 2.5 mm or below, saturated surface-dry condition)
Ice pieces: Pulverized by ice slicer The graph of FIG. 4 shows the relationship between the compression strength and bending strength to the water-cement ratio after 28 days aging.

It will be obvious from the graph that dense and high mechanical strength solidified products can be formed with water-cement ratios ranging from 25 to 30%.

EXAMPLE 5

Figure 5:
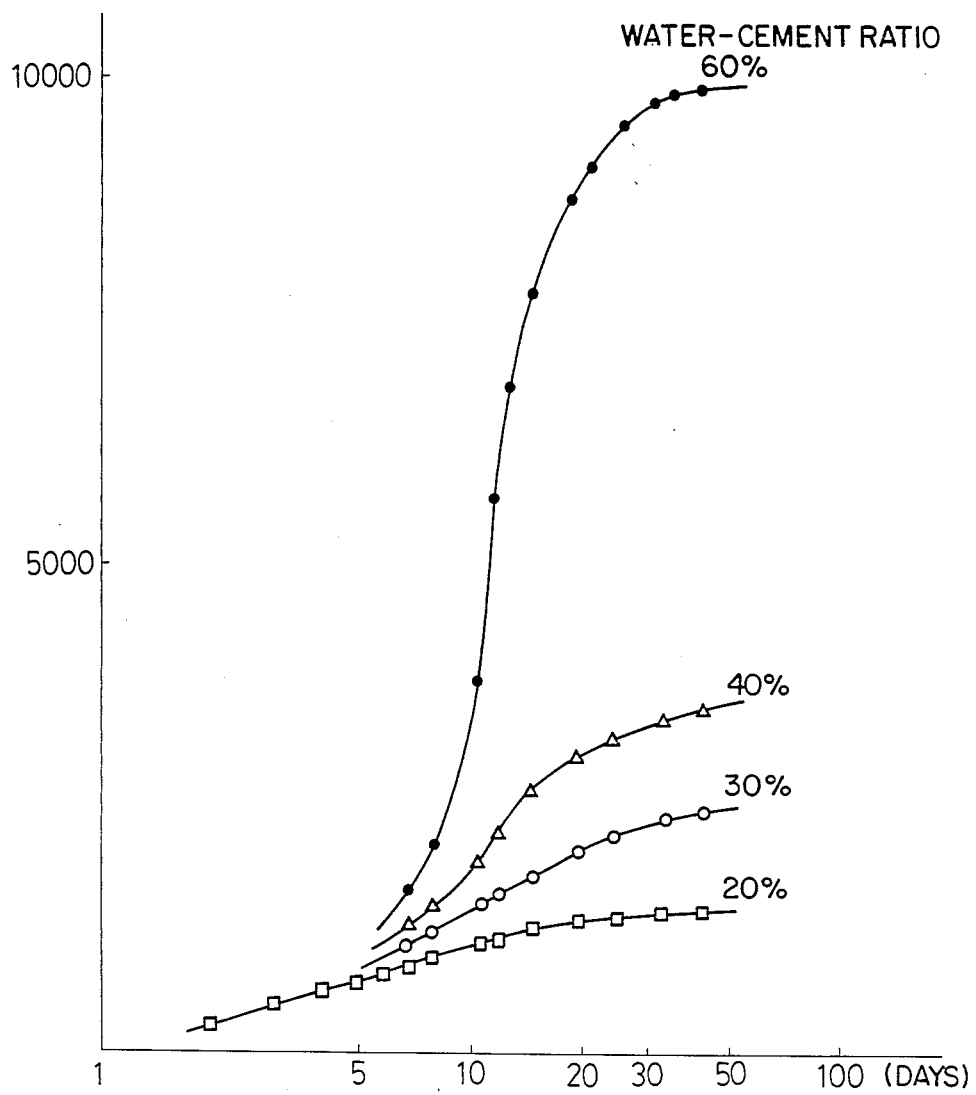
FIG. 5 is a graph showing a relation between drying shrinkage strain and age of cement paste in Example 5.

Cement pastes with water-cement ratios of 20, 30, 40 and 60% were prepared by the method noted above, and the relationship between the shrinkage strain and age was observed. The results are as shown in the graph of FIG. 5. The solidified products were cylinders with a diameter of 5 cm and a height of 10 cm, and the shrinkage was measured under conditions of a room temperature of 15° C. and a relative humidity of 60%.

As is obvious from the graph, solidified products of very low shrinkage strain could be obtained with low water cement ratios by the method noted above.

EXAMPLE 6

Sand (standard sand in Toyoura, oven-dry condition) and cement in a weight ratio of 2:1 were kneaded together for 3 minutes in a mortar mixer at a room temperature of 15° C., then ice pieces were added in a water-cement ratio of 20%, and the mixture was kneaded to prepare mortar. This mortar was homogeneous, and the solidified product was for 28 days, has a compression strength of 470 kg/cm$^2$ and a bending strength of 59 kg/cm$^2$.

As a contrast, cement and ice pieces were kneaded in a mixer under the same conditions as noted above for 3 minutes, and then the mixture was kneaded together with added sand. In this case, homogeneous mortar could not be obtained, but only local masses of cement paste were generated. The solidified product, obtained by curing the mortar in the sealed state for 28 days, had a compression strength of 250 kg/cm$^2$ and a bending strength of 39 kg/cm$^2$.

EXAMPLE 7

Mortar prepared by the method noted above was compression molded in a mold, capable of draining by pressure application, under the following conditions:
Mortar: Composed of ice pieces, cement and river sand (oven-dry condition: 2.5 mm or below), weight ratio 0.25:1.0:2.0
Compression Molding: 1,000 kg/cm$^2$, slight amount of water being squeezed out.

The seven-day mechanical strength of the solidified product thus obtained had a bending strength of 116 kg/cm$^2$ and compression strength of 730 kg/cm$^2$.

A cement paste prepared by the method noted above was compression molded under the following conditions in the same mold capable of draining water.
Cement paste: Ice pieces and cement, weight ratio 0.20:1.0
Compression Molding: 840 kg/cm$^2$, slight amount of water being squeezed out.

The 28-day mechanical strength of the solidifed product thus obtained had a bending strength of 254 kg/cm$^2$ and a compression strength of 1,446 kg/cm$^2$.

EXAMPLE 8

Mortar prepared by the same method of preparation was compression molded under the same pressure as in Example 6, and in a mold capable of draining water, under the following conditions.
Mortar: Ice pieces, cement, iron powder *1 and iron powder *2, weight ratio 0.25:1.0:1.0:1.0
*1 ... Iron powder obtained from casting burrs having passed through a 12 mm sieve and retained on a 0.6 mm sieve
*2 ... Iron powder obtained from casting burrs having passed through a 0.6 mm sieve and retained on a 0.23 mm sieve
Compression molding: 1,000 kg/cm$^2$ slight amount of water being squeezed out.

The 28-day mechanical strength of the solidified product thus obtained had a bending strength of 283 kg/cm$^2$ and a compression strength of 1,190 kg/cm$^2$.

Mortar prepared by the method noted above was compression molded in the same mold and under the following conditions.
Mortar: Ice pieces, cement and asbestos. weight ratios 0.2:1.0:1.0 and 0.2:1.0:0.25
Compresison molding: 1,000 kg/cm$^2$, slight amount of water being squeezed out.

The 28-day mechanical strength of the two different solidified products had, respectively, bending strengths of 156 and 116 kg/cm$^2$ and compression strengths of 784 and 1,089 kg/cm$^2$.

EXAMPLE 9

Solidified products were formed by using cement pastes of a superlow water-cement ratio under pressure in a non-draining mold under the following conditions.
Cement paste: Ice pieces *1 and cement *2, weight ratios 0.04:1.0 and 0.075:1.0
*1 ... Ice pieces at −20° C. having passed through a 0.6 mm sieve. These ice pieces were obtained by pulverizing ice using an ice slicer, deep freezing the pulverized ice in a freezing chamber to about −20° C., pulverizing the cooled ice again and then sieving the ice.
*2 ... Cement deep frozen to below −20° C.

Compression molding was done with a pressure of 1,000 kg/cm$^2$ without draining water. The solidified products thus obtained had, respectively, bending strengths of 139 and 225 kg/cm$^2$ and compression strengths of 567 and 1,005 kg/cm$^2$.

EXAMPLE 10

Concrete prepared by the method noted above was charged into a mold using a vibrator to form a solidified product.
Concrete: Ice pieces, cement, sand *1 and gravel *2, weight ratio 0.3:1.0:2.0:2.0
Kneading process ... Cement and sand were kneaded using a mortar mixer for one minute, and the mixture then is kneaded together with added ice pieces for approximately 3 minutes, and then the mixture was manually kneaded together with added gravel.
*1 ... Sand of 2.5 mm or below under saturated surface-dry condition
*2 ... Gravel of 10 mm or below under saturated surface-dry condition
Method of charging:
Mold ... cylindrical mold with a diameter of 10 cm and a height of 20 cm
Vibrator ... a rod-like vibrator with a rod diameter of 27 mm
Curing ... Sealed curing The 28-day mechanical strength of the solidified product obtained had a compression strength of 550 kg/cm$^2$.

Industrial Applicability

The method of preparing and molding mortar according to the present invention can be extensively applied to various concrete products and products of cement-containing compositions as well as to concrete works and mortar works mainly in the civil engineering and construction fields.

I claim:
1. A method of preparing mortar including cement and aggregate using ice pieces to improve the mixing of the mortar and to provide water for hydration of cement comprising the steps of mixing cement, aggregate and ice pieces with gradual melting of the ice pieces to provide a greater degree of fluidity of mortar prior to hardening than is obtained by substitution of liquid water for said ice pieces in the same water-cement ratio and to uniformly disperse said cement, aggregate and ice pieces prior to substantial melting of the ice pieces, melting substantially completely all remaining ice pieces prior to placement of the mortar, and causing hydration of the cement and water resulting from the melting of said ice pieces.

2. The method of claim 1, wherien at least a portion of the hydration of cement and water is done at an elevated pressure.

3. The method of claim 1, wherein cement, aggregate and ice pieces are kneaded together.

4. The method of claim 1, wherein cement and fine aggregate are first mixed, then ice pieces are added to the mixture.

5. The method of claim 1, wherein coarse aggregate is added to the mixture after ice pieces are added.

6. The method of claim 1, wherein cement, aggregate and ice pieces are simultaneously mixed and kneaded together.

7. The method of claim 1, wherein said ice pieces are obtained by freezing water containing a monomer or a polymer.

8. The method of claim 1, wherein mortar contains fibers to form fiber-reinforced mortar or fiber-reinforced concrete.

9. The method of claim 1, wherein mortar or concrete contains metal powders.

10. The method of claim 1, including the step of providing said ice pieces at a temperature between $-2°$ C. and $-26°$ C.

* * * * *